(12) United States Patent
Asaga et al.

(10) Patent No.: US 9,225,210 B2
(45) Date of Patent: Dec. 29, 2015

(54) ROTOR FOR ELECTRIC ROTATING MACHINE AND METHOD FOR MANUFACTURING THE SAME

(75) Inventors: Takashi Asaga, Toyota (JP); Toshiya Sugiyama, Okazaki (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 516 days.

(21) Appl. No.: 13/614,851

(22) Filed: Sep. 13, 2012

(65) Prior Publication Data

US 2013/0076197 A1 Mar. 28, 2013

(30) Foreign Application Priority Data

Sep. 24, 2011 (JP) .................................. 2011-208281

(51) Int. Cl.
*H02K 1/28* (2006.01)
*H02K 1/27* (2006.01)
*H02K 15/03* (2006.01)

(52) U.S. Cl.
CPC .................. *H02K 1/28* (2013.01); *H02K 1/276* (2013.01); *H02K 15/03* (2013.01); *Y10T 29/49012* (2015.01)

(58) Field of Classification Search
CPC ................................ H02K 1/28; H02K 1/185
USPC ..................... 310/216.114–216.118, 216.124, 310/216.127, 216.128, 216.129, 216.131, 310/216.132, 400–433
IPC ......................................................... H02K 1/28
See application file for complete search history.

(56) References Cited

U.S. PATENT DOCUMENTS

| | | | | |
|---|---|---|---|---|
| 2,795,714 | A | * | 6/1957 | Baudry .......................... 310/256 |
| 4,227,109 | A | * | 10/1980 | Mulach .................. 310/216.114 |
| 6,337,530 | B1 | * | 1/2002 | Nakamura et al. ...... 310/216.066 |
| 2008/0231138 | A1 | * | 9/2008 | Onimaru et al. .............. 310/217 |
| 2011/0101819 | A1 | * | 5/2011 | Hsieh ...................... 310/216.114 |
| 2011/0204743 | A1 | * | 8/2011 | Meier et al. ............ 310/216.008 |

FOREIGN PATENT DOCUMENTS

| JP | 2008-289329 A | 11/2008 |
|---|---|---|
| JP | 2010233291 A | * 10/2010 |

OTHER PUBLICATIONS

Machine Translation, FU, JP 2010233291 A, Oct. 14, 2010.*

* cited by examiner

*Primary Examiner* — Thomas Truong
(74) *Attorney, Agent, or Firm* — Sughrue Mion, PLLC

(57) ABSTRACT

A rotor for an electric rotating machine includes a core body member formed, first and second end plates provided at respective side faces of the core body member, and a fixing member inserted into through holes provided at the core body member and the end plates. The end plates include positioning portions at an outer or inner circumferential surface, wherein when the fixing member is engaged with the end plates, the positioning portion is engageable with positioning receive portions corresponding to the positioning portions and positioning at radially outer or inner portion of the end plate. When one of the end plates is placed facing the side face of the core body member in a reversed state, the end plate and the core body member are not assembled each other by positional relationship between the positioning portions, the positioning receive portions and the through holes.

7 Claims, 14 Drawing Sheets

ROTOR FOR ELECTRIC ROTATING MACHINE AND METHOD FOR MANUFACTURING THE SAME

CROSS REFERENCE TO RELATED APPLICATIONS

This application is based on and claims priority under 35 U.S.C. §119 to Japanese Patent Application 2011-208281, filed on Sep. 24, 2011, the entire content of which is incorporated herein by reference.

TECHNICAL FIELD

This disclosure generally relates to a rotor for electric rotating machine and a method for manufacturing the same.

BACKGROUND DISCUSSION

An example of known rotor for electric rotating machine is disclosed in JP2008-289329A (which will be hereinafter referred to as Patent reference 1). In the Patent reference 1, the rotor includes a rotor core which is formed by stacking plural magnetic steel sheet. The rotor core is sandwiched between a pair of end plates along a stacking direction of the rotor core, a pin is penetrated through the rotor core and the end plates and pressed with deforming at both end of the pin, and then the rotor core is held by the end plates.

According to the Patent reference 1, since a taper portion is formed at an outer circumference of the end plate by riveting or caulking or press-deforming the pin penetrated through the end plates, the taper portion provided at the rotor core side presses the rotor core and the rotor core is rigidly held by the end plates.

The two sides of the end plate of the electric motor disclosed in the Patent reference 1 have different directionality because of the taper portion formed on the one side face of the end plate. That is, when the end plates are attached to the rotor core with wrong directionality (i.e. a first side intended to face the stacking steel sheet and a second side opposite to the first side of the end plate is reversed and the second side of the endplate faces the rotor core) for placing the rotor core to be sandwiched between a pair of end plates, the outer circumference of the end plate is warped in a direction separating from the rotor core. Therefore, since press load does not act on the outer circumference of the end plate, holding force of the end plates acting on the rotor core may become insufficient by the centrifugal force caused by rotation of the rotor.

In another example of a known end plate different from the end plate of the Patent reference 1, the end plate has a flat plate-like shape without taper portion at on an outer circumference of the known end plate, and a pair of the end plates is normally pressed to the rotor core in a state where whole area of a side of the end plate contacts the rotor core. In this case, the end plate is arranged so that a face of the end plate which does not have a shear droop at the peripheral circumference of the end plate faces the side of the rotor core. Therefore, in this case as well, when the end plates are attached to the rotor core on the wrong side, holding force of the end plates acting on the rotor core may become insufficient by the centrifugal force caused by the rotation of the rotor.

A need thus exists for a rotor for electric rotating machine and a method for manufacturing the same which are not susceptible to the drawback mentioned above.

SUMMARY

According to an aspect of this disclosure, a rotor for an electric rotating machine includes a core body member formed by stacking a plurality of core plates in an axial direction along a rotational axis, and including a plurality of through holes, first and second end plates annually formed and provided at respective side faces of the core body member, and including a plurality of through holes, and a fixing member inserted into each of the plurality of through holes provided at the core body member and the first and second end plates, and engaged with each of the first and second end plates at opposite ends of the fixing member, a plurality of positioning portions provided at an outer circumferential surface or inner circumferential surface of each of the first and second end plates. When the fixing member is engaged with the first and second end plates, the positioning portions are engaged with positioning receive portions corresponding to the positioning portion and positioning at radially outer portion or radially inner portion of the first and second end plates. When one of the first and second end plates is placed facing the side face of the core body member in a reversed state, the first and second end plates and the core body member are not assembled each other for at least one of the following reasons: a portion, at which the positioning portion is not provided, allocated at the outer circumferential surface or the inner circumferential surface of the first and second end plates contacts one of the positioning receive portions, the positioning portion which is not engageable with the positioning receive portion contacts to the positioning receive portion, and a relative position between the through hole of the core body member and the through hole of the first and second end plates is shifted in a circumferential direction. In a state where one of the first and second end plates is placed facing the side face of the core body member in a correct state, one of the positioning portions of the first end plate and one of the positioning portions of the second end plate are located at opposite sides relative to the rotational axis.

According to another aspect of this disclosure, a method for manufacturing a rotor for an electric rotating machine includes processes of: forming a core body member by stacking a plurality of core plates in an axial direction along a rotational axis, fixing a first end plate, the core body member and a second end plate by placing the core body member between the first end plate and the second end plate in the axial direction along the rotational axis, inserting fixing member into each of a plurality of through holes provided at the first end plate, the core body member and the second end plate, and engaging opposite ends of the fixing member with the first end plate and the second end plate. In the engaging process, a plurality of positioning portions provided at an outer circumferential surface or inner circumferential surface of the first end plate and the second end plate is engaged with positioning receive portions corresponding to the positioning portion and positioning at radially outer portion or radially inner portion of the first and second end plates. When one of the first and second end plates is placed facing the side face of the core body member in a reversed state, the first and second end plates and the core body member are not assembled each other for at least one of the following reasons: a portion, at which the positioning portion is not provided, allocated at the outer circumferential surface or the inner circumferential surface of the first and second end plates contacts one of the positioning receive portions, the positioning portion which is not engageable with the positioning receive portion contacts to the positioning receive portion, and a relative position between the through hole of the core body member and the through hole of the first and second end plates is shifted in a circumferential direction. In a state where one of the first and second end plates is placed facing the side face of the core body member in a correct state, one of the positioning portions of the first end plate and one of the positioning portions of the second end plate are located at opposite sides relative to the rotational axis.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

<First Embodiment>

A rotor 4 of an electric motor 1 according to a first embodiment will be explained with reference to FIGS. 1 to 8. The electric motor 1 (corresponding to an electric rotating machine) is, for example, a synchronous motor applied for driving wheels of a hybrid vehicle and is equipped between a clutch device connected to an internal-combustion engine and a transmission. However, the electric rotating machine is not limited to the above example, can be applied for any electric motor such as a motor provided for electrical appliances for home use or a motor for driving common industrial machines. Wordings "direction of rotational axis" and "axial direction" correspond to a direction, or orientation along a rotational axis C of the electric motor 1 (i.e. horizontal direction in FIG. 1) unless otherwise noted.

Figure 1:
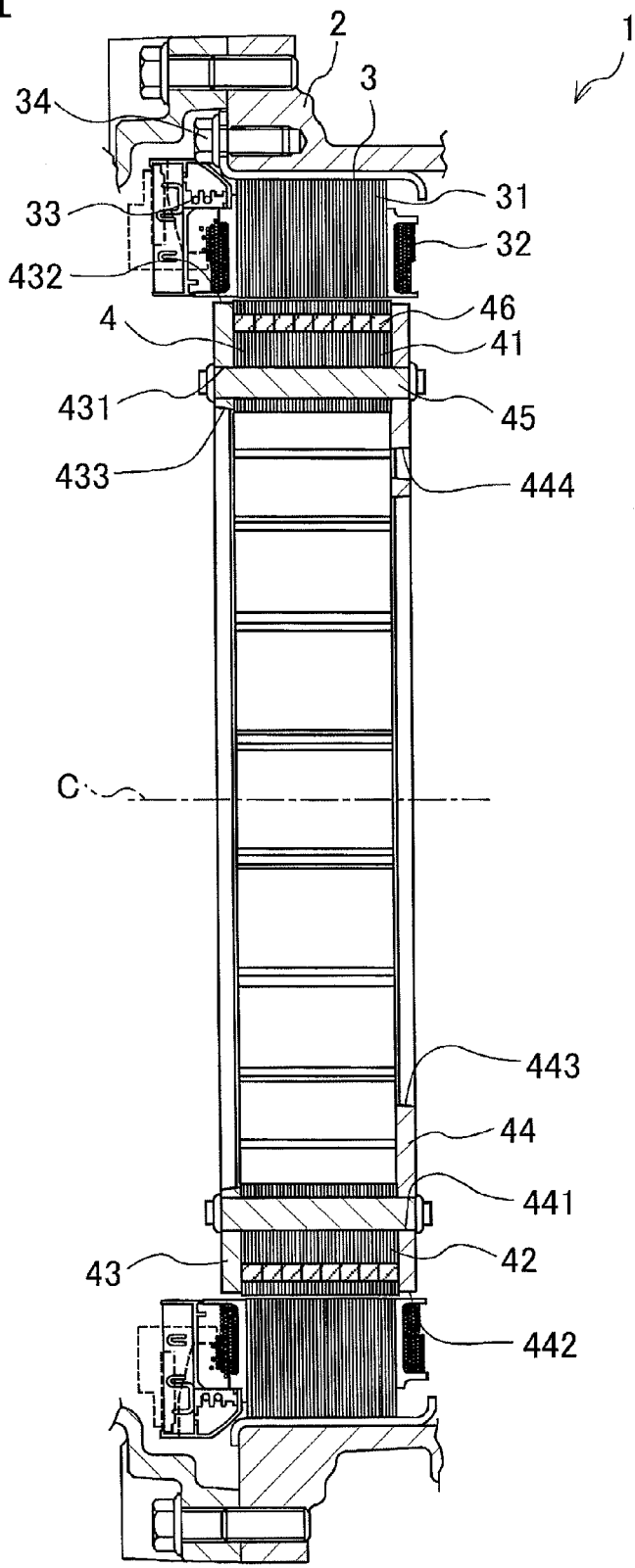
FIG. 1 is a cross-sectional view illustrating an electric motor mounted to a vehicle according to a first embodiment disclosed here.

As shown in FIG. 1, a motor housing 2 (corresponding to housing) is integrally formed by metal material such as aluminum base alloy and includes a stator 3 and a rotor 4 of the electric motor 1. The motor housing 2 is provided between the engine (in front of the motor housing 2) and the transmission (in the rear of the motor housing 2).

The stator 3 of the electric motor 1 is mounted on an inner circumference of the motor housing 2 by a screw 34. A coil 32 which serves as a conductive material for generating rotating magnetic field is wound on each of plural cores 31 of the stator 3. The coil 32 is connected to an inverter provided outside of the motor housing 2 via a bus ring 33.

The rotor 4 of the electric motor 1 is provided at a radially inward of the stator 3. The rotor 4 is provided to face the stator 3 with a predetermined gap therebetween. The rotor 4 includes a core body member 41 in which plural laminated steel sheet 42 (corresponding to core plates) is stacked or laminated along the direction of the rotational axis C.

Figure 6:
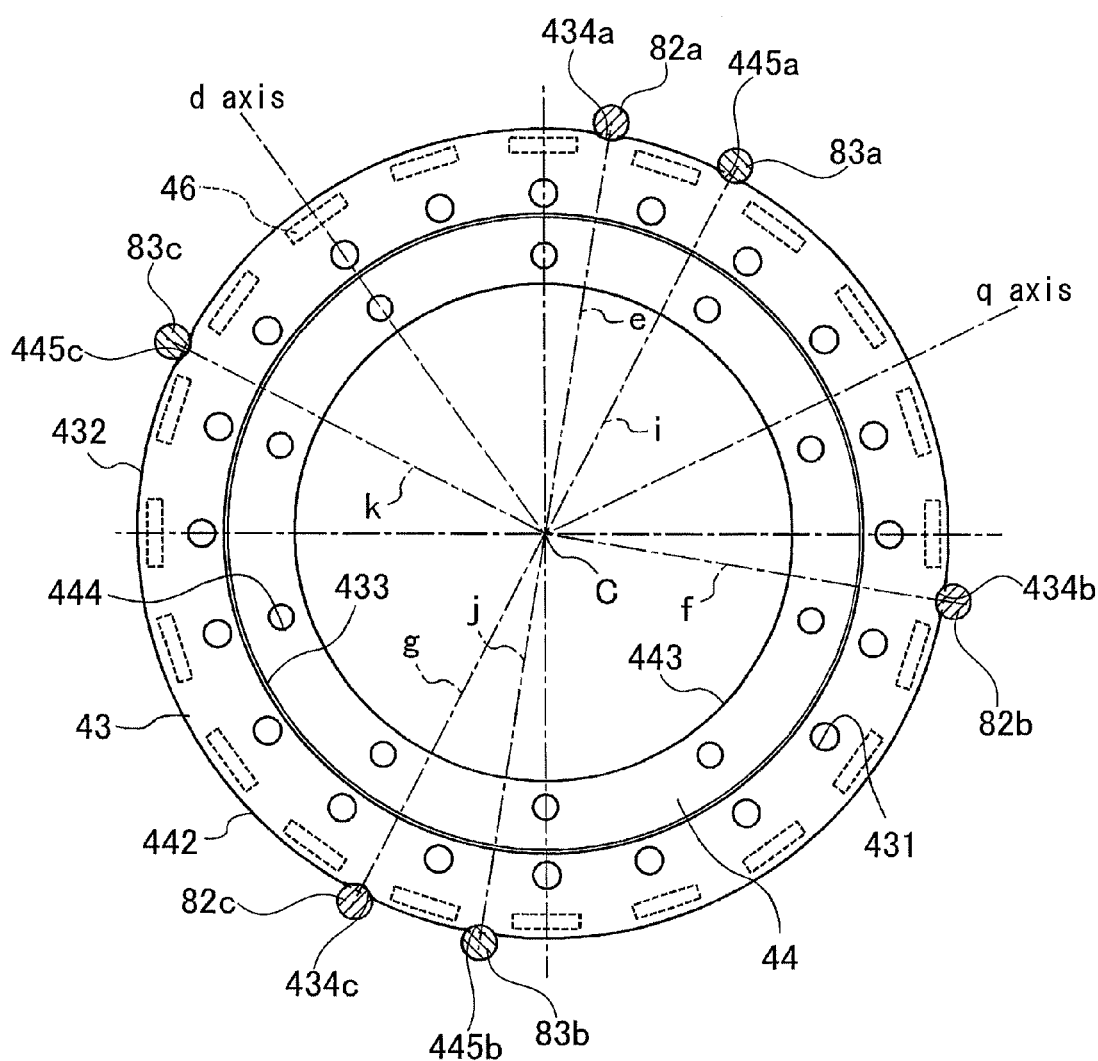
FIG. 6 is a plain view illustrating fixing process of the rotor viewed from upper side in FIG. 5.

As opposite end surfaces of the core body member 41 is sandwiched between the first and second end plates 43, 44, a fixing pin 45 (corresponding to a fixing member) is penetrated through the core body member 41 with the pair of the end plates 43, 44 along stacking direction. By press-deforming opposite ends of the fixing pin 45, both ends of the fixing pin 45 engages with the corresponding end plates 43, 44 which contact with the fixing pin 45, respectively. Thus, it is prevented the end plates 43, 44 from separating from each other and the core body member 41 is held by the end plates 43, 44. In addition, as shown in FIG. 6, field pole magnets 46 serving as field pole with, for example, twenty poles are provided at the circumference of the rotor 4.

Figure 2:
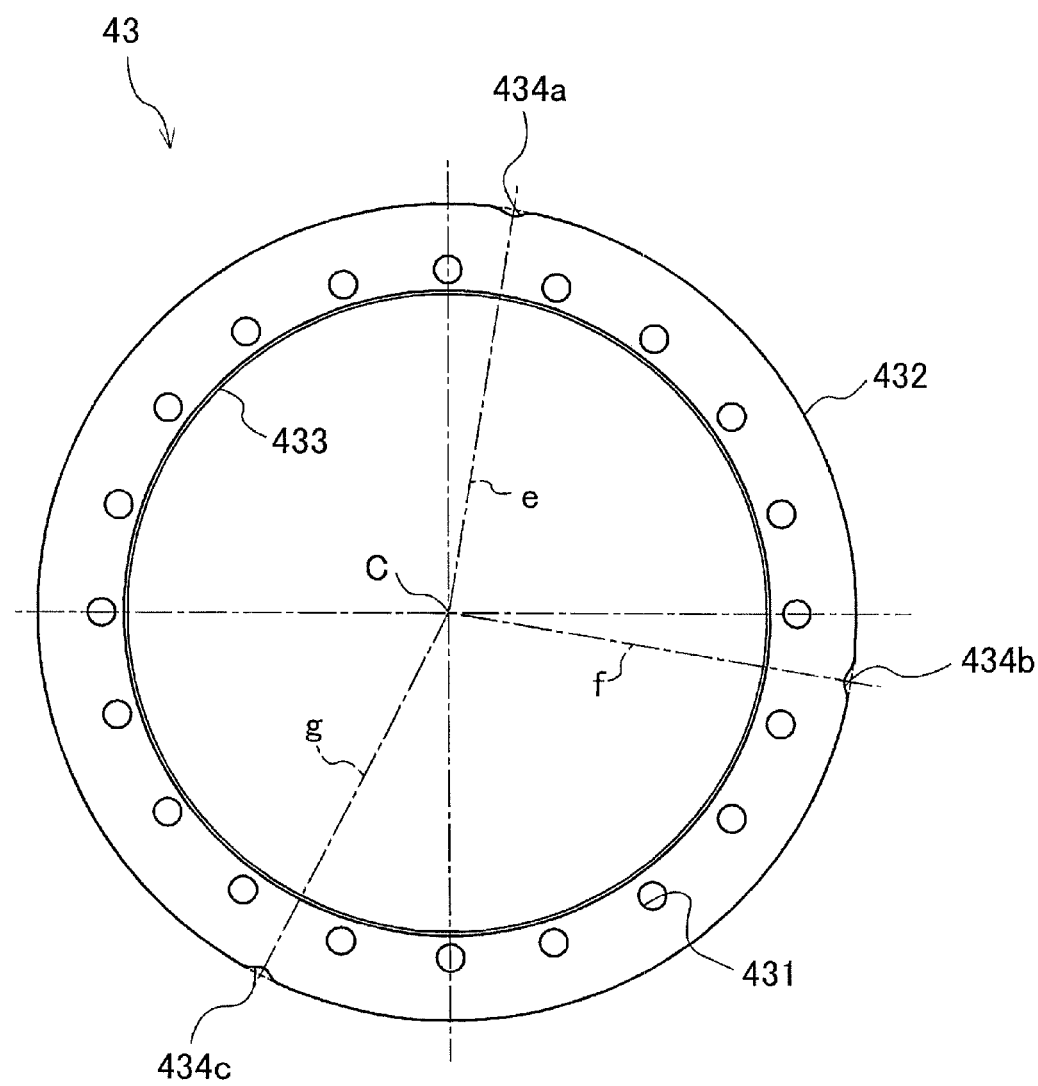
FIG. 2 is a plain view illustrating a first end plate of a rotor viewed from left side in FIG. 1.
Figure 3:
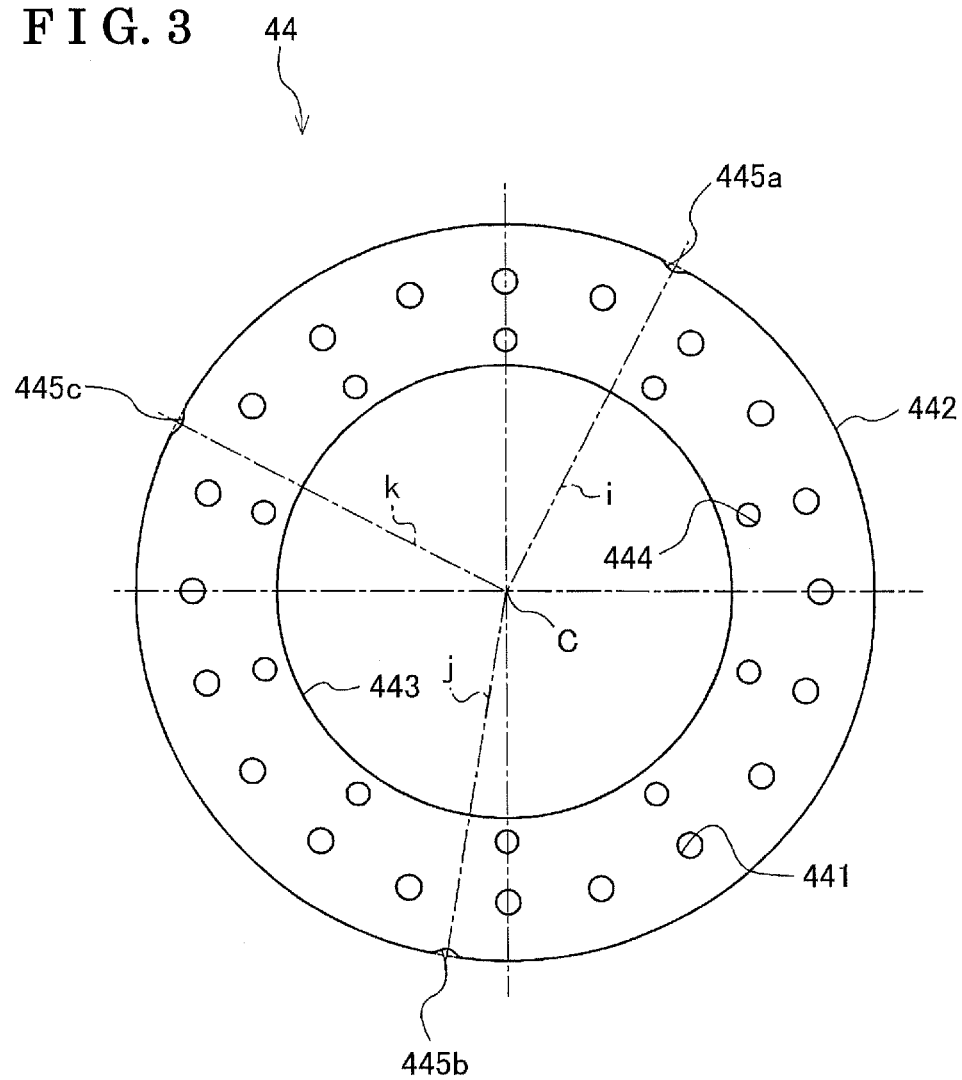
FIG. 3 is a plain view illustrating a second end plate of the rotor viewed from left side in FIG. 2.

The first end plate 43 is formed in a substantially ring shape and includes, for example, twenty caulking holes 431 (corresponding to through holes) for inserting the fixing pin 45. As shown in FIG. 2, the caulking holes 431 are arranged with equal interval, or to be equally spaced on a circumference. The second end plate 44 is also formed in a substantially ring shape, and an outer circumference 442 of the second end plate 44 has same diameter as an outer circumference 432 of the first end plate 43. The second end plate 44 includes, for example, twenty pin holes 441 (corresponding to through holes). As shown in FIG. 3, the pin holes 441 are arranged with equal interval, or to be equally spaced on a circumference and position of the pin holes 441 is correspondent with the position of the caulking holes 431 of the first end plate 43.

The second end plate 44 is formed to extend from a portion of the second end plate 44 in the vicinity of the pin hole 441 in radially inward direction of the second end plate 44. An inner circumference 443 of the second end plate 44 is formed to have a smaller diameter than an inner circumference 433 of the first end plate 43. Plural bolt hole 444 is provided at a position between the pin hole 441 and the inner circumference 443 of the second end plate 44. The bolt holes 444 are provided so as to attach the inner circumference portion of the second end plate 44 to a drum member by joint bolts. The second end plate 44 is rotatably attached to the motor housing 2 via the drum member.

In the electric motor 1 having the structure described above, an electric power (for example, three-phase alternating current) is supplied to the coil 32 via an inverter from a battery of a vehicle. Thus, rotating magnetic field is generated at the stator 3, and the rotor 4 rotates relative to the stator 3 as a result of attraction force or repulsion force caused by the rotating magnetic field.

As shown in FIG. 2, the outer circumference 432 of the first end plate 43 includes three cutout portions 434a, 434b, 434c (corresponding to a positioning portion). The cutout portion 434a is provided on a line e which is perpendicularly drawn from an intermediate point between two adjoining caulking holes 431 to the rotational axis C. The cutout portion 434b is provided on a line f which is perpendicularly drawn from an intermediate point between two adjoining caulking holes 431 to the rotational axis C. The cutout portion 434c is provided on a line g which is perpendicularly drawn from an intermediate point between two adjoining caulking holes 431 to the rotational axis C. In other words, the cutout portions 434a, 434b, 434c are provided on extended lines of lines e, f, g, respectively, which are perpendicularly drawn from the rotational axis C to points on circumference between two adjoining caulking holes 431.

Each cutout portion 434a, 434b, 434c is formed to have same shape and same size and formed to have approximately arc shape or recessed shape provided at the outer circumference 432. The cutout portions 434a, 434b, 434c can be engaged with, or configured to be engaged with corresponding first positioning pins 82a, 82b, 82c, respectively (FIG. 6).

In this embodiment, a circumferential distance between two of the adjoining cutout portions 434a, 434b, 434c is different from a circumferential distance between other combinations of the adjoining cutout portions 434a, 434b, 434c. For example, an angle defined by the line e which is perpendicularly drawn from the cutout portion 434a to the rotational axis C and the line f which is perpendicularly drawn from the cutout portion 434b to the rotational axis C is approximately 90 degrees. An angle defined by the line f which is perpendicularly drawn from the cutout portion 434b to the rotational axis C and the line g which is perpendicularly drawn from the cutout portion 434c to the rotational axis C is approximately 108 degrees. An angle defined by the line g which is perpendicularly drawn from the cutout portion 434c to the rotational axis C and the line e which is perpendicularly drawn from the cutout portion 434a to the rotational axis C is approximately 162 degrees.

On the other hand, as shown in FIG. 3, the outer circumference 434 of the second end plate 44 includes three cutout portions 445a, 445b, 445c (corresponding to a positioning portion). The cutout portion 445a is provided on a line i which is perpendicularly drawn from an intermediate point between two adjoining pin holes 441 to the rotational axis C. The cutout portion 445b is provided on a line j which is perpendicularly drawn from an intermediate point between two adjoining pin holes 441 to the rotational axis C. The cutout portion 445c is provided on a line k which is perpendicularly drawn from an intermediate point between two adjoining pin holes 441 to the rotational axis C. In other words, the cutout portions 445a, 445b, 445c are provided on extended lines of lines i, j, k, respectively, which are perpendicularly drawn from the rotational axis C to points on circumference between two adjoining pin holes 441.

Each cutout portion 445a, 445b, 445c is formed to have same shape and same size and formed to have approximately arc shape or recessed shape in which the cutout portions 445a, 445b, 445c can be engaged with corresponding second positioning pins 83a, 83b, 83c (FIG. 6).

In this embodiment, a circumferential distance between the adjoining cutout portions 445a, 445b, 445c is different from a circumferential distance between other combinations of the adjoining cutout portions 445a, 445b, 445c. For example, an angle defined by the line i which is perpendicularly drawn from the cutout portion 445a to the rotational axis C and the line j which is perpendicularly drawn from the cutout portion 445b to the rotational axis C is approximately 162 degrees. An angle defined by the line j which is perpendicularly drawn from the cutout portion 445b to the rotational axis C and the line k which is perpendicularly drawn from the cutout portion 445c to the rotational axis C is approximately 108 degrees. An angle defined by the line k which is perpendicularly drawn from the cutout portion 445c to the rotational axis C and the line i which is perpendicularly drawn from the cutout portion 445a to the rotational axis C is approximately 90 degrees.

Next, based on FIG. 4, FIG. 5 and FIG. 6, manufacturing method of the rotor 4 will be explained below.

Figure 4:
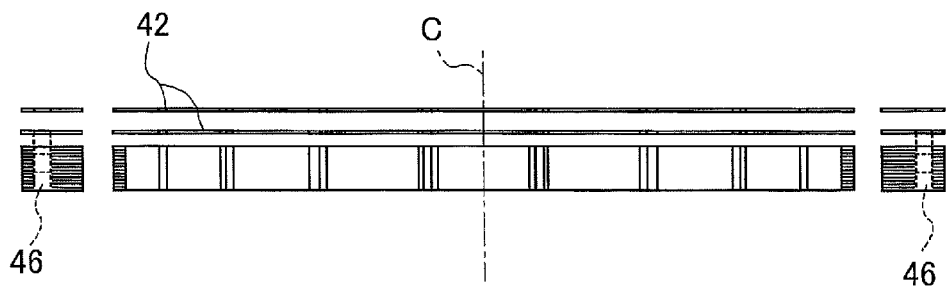
FIG. 4 is a schematic view schematically illustrating stacking process of the rotor shown in FIG. 1.

First, as shown in FIG. 4, plural laminated steel sheet 42 is stacked along the direction of the rotational axis C and the core body member 41 is formed by inserting, or penetrating the field pole magnet 46 (stacking process or forming process).

Figure 5:
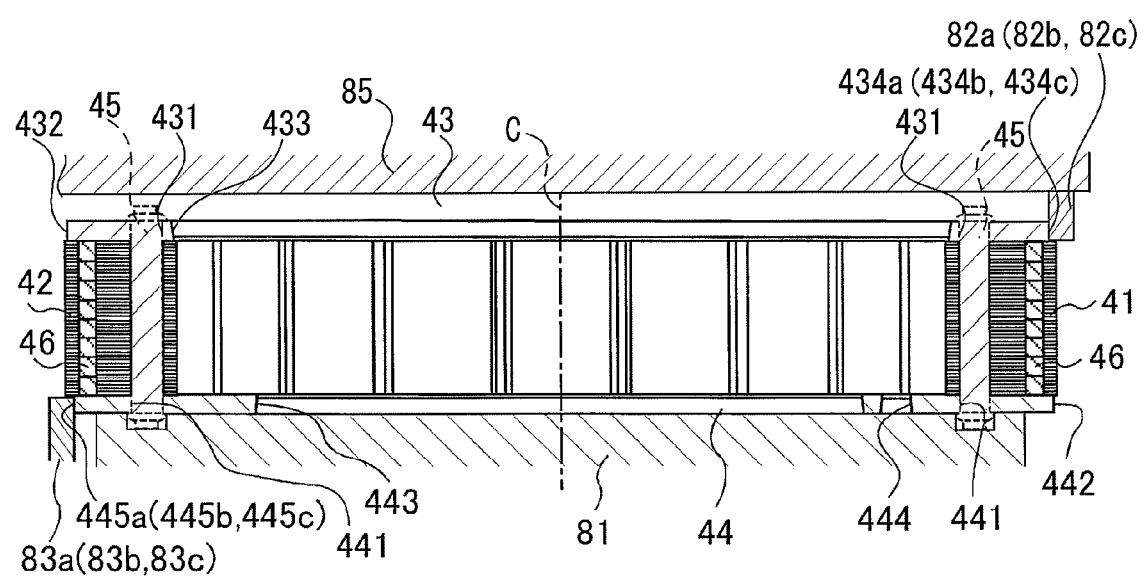
FIG. 5 is a schematic view schematically illustrating fixing process of the rotor shown in FIG. 1.

Next, as shown in FIG. 5, the second end plate 44 is placed on an assembling base 81, and the core body member 41 is placed on the second end plate 44, the first end plate 43 is placed on the core body member 41, and a check plate 85 is placed on the first end plate 43. In response to this, the first end plate 43 and the second end plate 44 are placed on both end faces, or opposite end surfaces (along the stacking direction) of the core body member 41. In this process, as shown in FIG. 6, the end plates 43, 44 are positioned so that the caulking hole 431 and the pin hole 441 are positioned on the same circumferential position which is on a perpendicular line drawn from the center of the field pole magnet 46 in the width direction to the rotational axis C. Hereinafter, the line which is perpendicularly drawn from the center of the field pole magnet 46 in the width direction to the rotational axis C is defined as a d-axis, and a line which is perpendicularly drawn from the intermediate position between two adjoining field pole magnets 46 to the rotational axis C is defined as a q-axis.

In this state, the fixing pin 45 is inserted to the caulking hole 431, the pin hole 441 and the core body member 41, which are formed on the end plates 43, 44, in the stacking direction, and opposite ends of the fixing pin 45 are riveted or caulked or pressed to rigidly fix with deformation of the fixing pin 45. Opposite ends of the fixing pin 45 are engaged with each end plate 43, 44. Therefore, the core body member 41 is sandwiched between the end plates 43, 44 which are prevented from separating from each other (fixing process, shown in FIG. 5). The check plate 85 may serve as a caulking jig which is used for caulking the fixing pin 45.

In the fixing process, as shown in FIG. 6, three first positioning pins 82a, 82b, 82c (corresponding to a positioning receive portion) are provided on the outer portion in a radial direction of the first end plate 43. As shown in FIG. 5, the first positioning pins 82a, 82b, 82c are provided on the check plate 85 as a projecting portion. In other words, the first positioning pins 82a, 82b, 82c are projected from an upper position than the first end plate 43 to downward to reach the lower end of the first end plate 43. Each of the first positioning pin 82a, 82b, 82c engages with the cutout portions 434a, 434b, 434c formed at the outer circumference 432 of the first end plate 43 for the positioning of the first end plate 43 in the circumferential direction.

As shown in FIG. 6, three second positioning pins 83a, 83b, 83c (corresponding to a positioning receive portion) are provided on the outer portion in a radial direction of the second end plate 44. As shown in FIG. 5, the second positioning pins 83a, 83b, 83c are provided on the assembling base 81 as projecting portion. In other words, the second positioning pins 83a, 83b, 83c are projected from an upper position than the second end plate 44 to downward to reach the lower end of the second end plate 44. Each of the second positioning pin 83a, 83b, 83c engages with the cutout portions 445a, 445b, 445c formed at the outer circumference 442 of the second end plate 44 for the positioning of the second end plate 44 in the circumferential direction.

As shown in FIG. 6, one of the cutout portions (for example, the cutout portion 434a) of the first end plate 43 and one of the cutout portions (for example, the cutout portion 445b) of the second end plate 44 are located at opposite sides relative to the rotational axis C. In addition, one of the cutout portions (for example, the cutout portion 445a) of the second end plate 44 and one of the cutout portions (for example, the cutout portion 434c) of the first end plate 43 are located at opposite sides relative to the rotational axis C.

Figure 7:
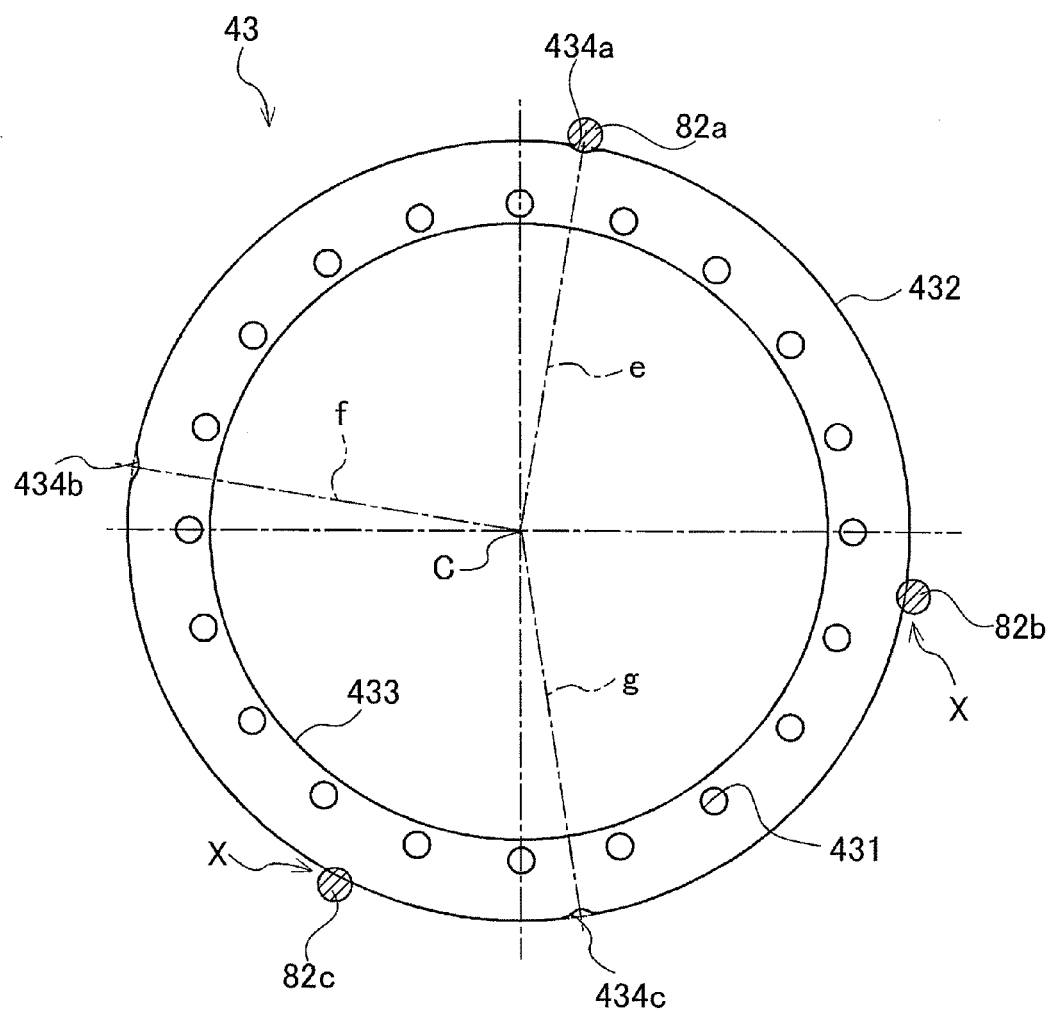
FIG. 7 is a plain view illustrating a reversed state of the first end plate.

As shown in FIG. 7, in the case of placing the first end plate 43 on the side face of the core body member 41 in a state where two sides, or opposite ends of the first end plate 43 are reversely arranged, that is, in a state where a reverse side of the first end plate 43 faces the core body member 41, in the fixing process (hereinafter referred to as reversed state), one of three first positioning pins (for example, the positioning pin 82a) can be engaged with the cutout portion 434a. However, other two first positioning pins (for example, the positioning pins 82b, 82c) contact with portions (indicated by a symbol X in FIG. 7) of the outer circumference 432 at which the cutout portion 434a, 434b, 434c is not provided. Therefore, the first end plate 43 cannot be placing relative to a right place of the core body member 41 and assembling of the first end plate 43 and the core body member 41 cannot be made.

Figure 8:
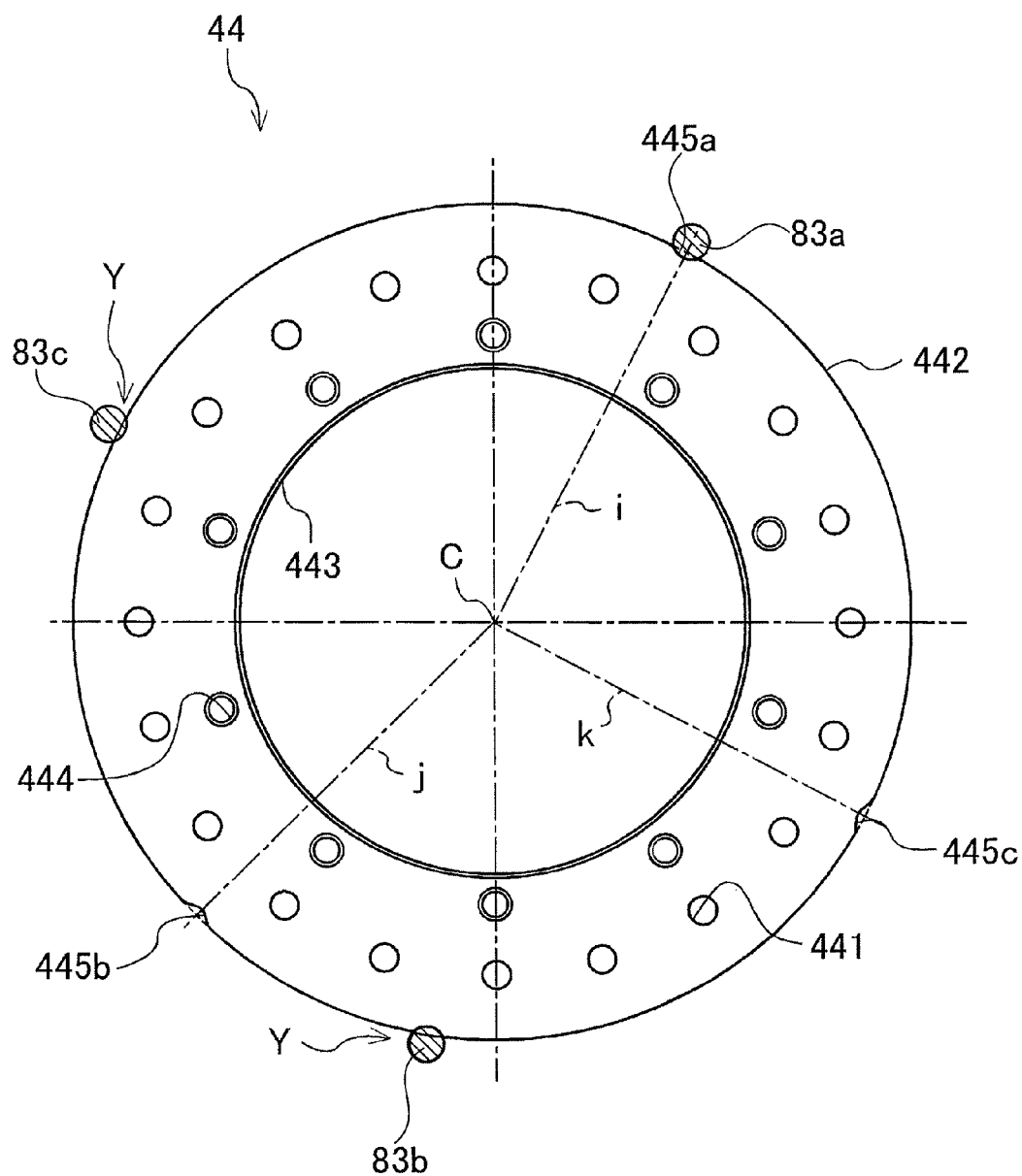
FIG. 8 is a plain view illustrating a reversed state of the second end plate.

Similarly, as shown in FIG. 8, in the case of placing the second end plate 44 on the side face of the core body member 41 in a state where two sides, or opposite ends of the second end plate 44 are reversely arranged, that is, in a state where a reverse side of the second end plate 44 faces the core body member 41, in the fixing process (hereinafter referred to as reversed state), one of three second positioning pins (for example, the positioning pin 83a) can be engaged with the cutout portion 445a. However, other two second positioning pins (for example, the positioning pins 83b, 83c) contact to portions (indicated by a symbol Y in FIG. 8) of the outer circumference 442 at which the cutout portion 445a, 445b, 445c is not provided. Therefore, the second end plate 44 cannot be placing relative to a right place of the core body member 41 and assembling of the second end plate 44 and the core body member 41 cannot be made.

According to the construction of the first embodiment, when the fixing pin 45 is engaged with the end plates 43, 44, plural positioning pins 82a, 82b, 82c, 83a, 83b, 83c which are engageable with the cutout portions 434a, 434b, 434c, 445a, 445b, 445c is provided at radially outward position of the end plates 43, 44. When at least one of the end plates 43, 44 is placed facing the side face of the core body member 41 with reversed state, at least one of the positioning pins 82a, 82b, 82c, 83a, 83b, 83c contacts the outer circumference 432, 442 of the end plates 43, 44 at which the cutout portions 434a, 434b, 434c, 445a, 445b, 445c are not provided. Therefore, since the end plates 43, 44 and the core body member 41 cannot be assembled each other, the end plates 43, 44 and the core body member 41 are prevented from being assembled with reversed state.

In addition, according to the construction of the first embodiment, when the end plates 43, 44 and the core body member 41 are assembled, the cutout portion 434a of the first end plate 43 and the cutout portion 445b of the second end plate 44 are located at opposite sides from each other relative to the rotational axis C and the cutout portion 445a of the second end plate 44 and the cutout portion 434c of the first end plate 43 are located at opposite sides relative to the rotational axis C. Therefore, weight balance of the rotor 4 can be optimized, vibration and noise caused by rotation of the rotor 4 is reduced, and rotation of the rotor 4 is stabilized.

In addition, at least three cutout portions 434a, 434b, 434c (445a, 445b, 445c) are formed on the outer circumference 432 (442) of the end plate 43 (44), and circumferential distance between two of the adjoining cutout portion 434a, 434b, 434c, 445a, 445b, 445c is different from circumferential distance between other combinations of the adjoining cutout portions 434a, 434b, 434c, 445a, 445b, 445c. When at least one of the end plates 43, 44 is placed facing the side face of the core body member 41 with reversed state, at least one of the positioning pins 82a, 82b, 82c, 83a, 83b, 83c contacts the outer circumference 432, 442 of the end plate 43, 44 at which the cutout portions 434a, 434b, 434c, 445a, 445b, 445c are not provided. Therefore, the end plates 43, 44 and the core body member 41 are surely prevented from being assembled with reversed state.

<Second Embodiment>

Figure 9:
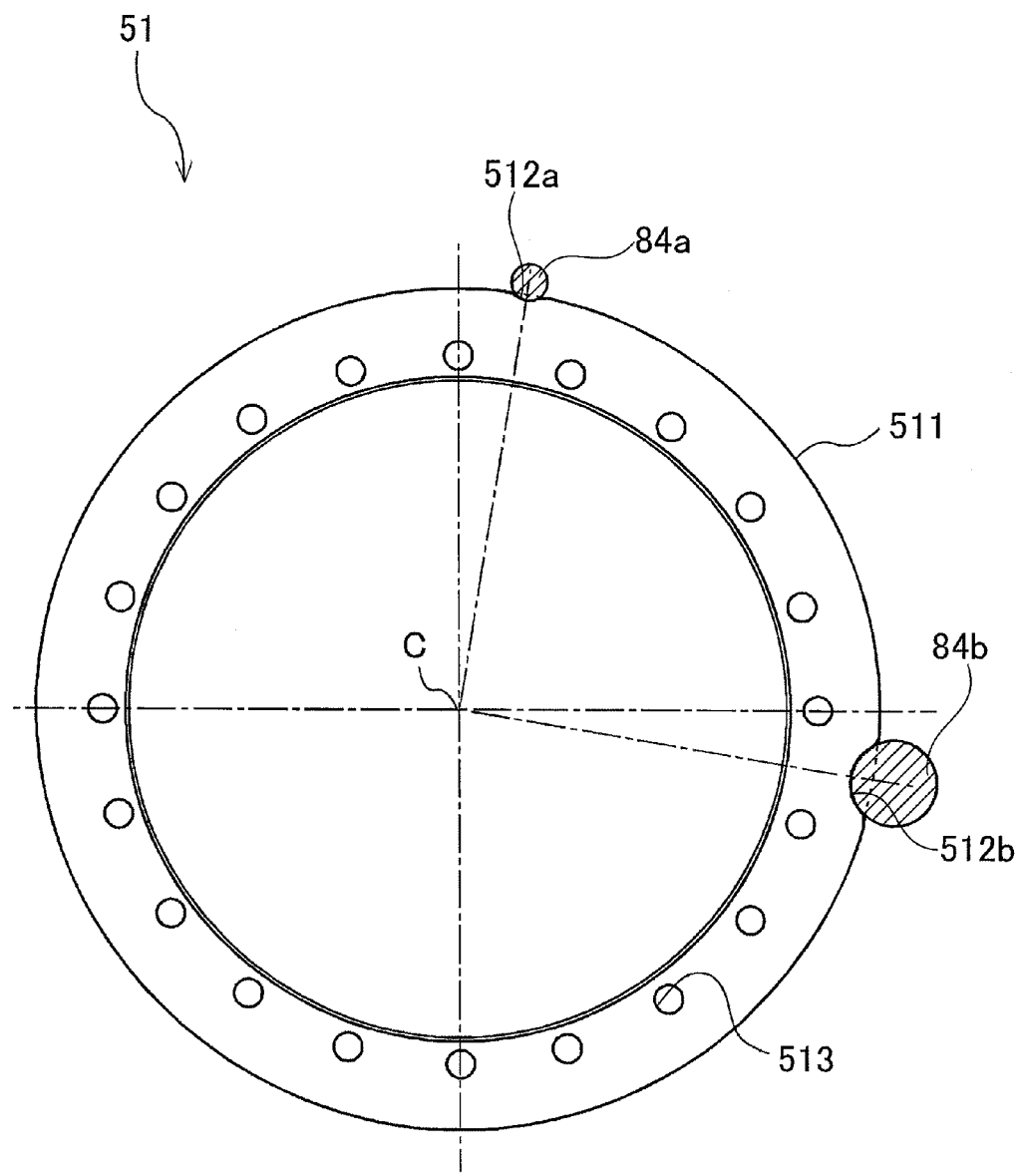
FIG. 9 is a plain view illustrating the first end plate according to a second embodiment disclosed here.

A first end plate 51 according to a second embodiment will be explained with reference to FIGS. 9 and 10. As shown in FIG. 9, two cutout portions 512a, 512b are formed on an outer circumference of the first end plate 51. The cutout portion 512a is provided on a line (q-axis) which is perpendicularly drawn from an intermediate point between two adjoining caulking holes 513 to the rotational axis C. In addition, the cutout portion 512b is also provided on a line (q-axis) which is perpendicularly drawn from an intermediate point between two adjoining caulking holes 513 to the rotational axis C.

The cutout portions 512a, 512b are formed to be approximately arc shape or recessed shape on the outer circumference 511 so that the cutout portions 512a, 512b engage with the first positioning pins 84a, 84b, respectively. As shown in FIG. 9, size of the cross-section taken perpendicular to the axial direction of the first positioning pin 84b is considerably greater than the size of the cross-section taken perpendicular to the axial direction of the first positioning pin 84a. Therefore, the width and the depth of the cutout portion 512b which is formed to conform to the size of the first positioning pin 84b are greater than those of the cutout portion 512a.

Figure 10:
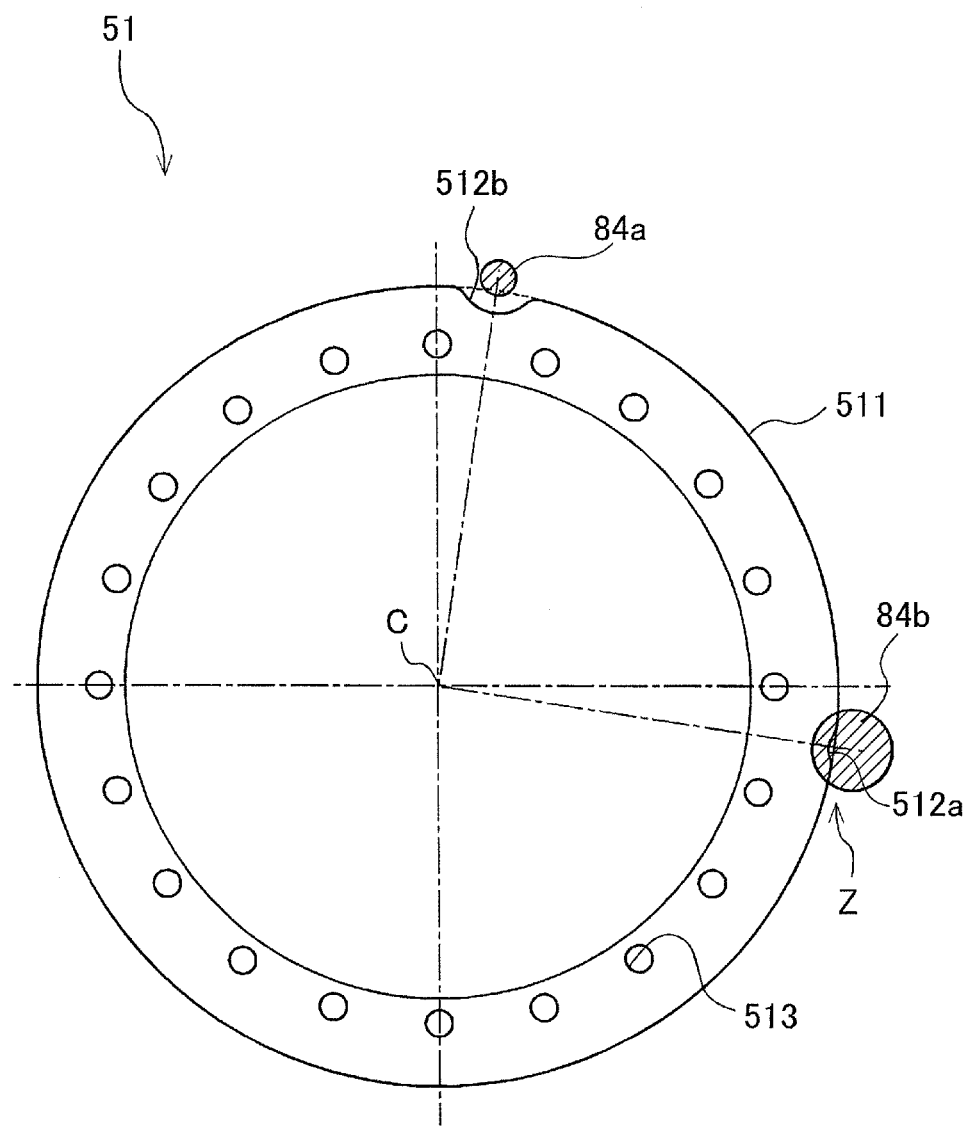
FIG. 10 is a plain view illustrating a reversed state of the first end plate shown in FIG. 9.

As shown in FIG. 10, when the first end plate 51 is placed with reversed state, that is, a reverse side of the first end plate 51 is arranged to face the core body member 41, the first positioning pin 84b formed with larger size contacts the cutout portion 512a formed with smaller size (indicated by a symbol Z in FIG. 10). Since the first positioning pin 84b and the cutout portion 512a cannot be engaged with each other, the first end plate 51 cannot be placing relative to a right place of the core body member 41, and assembling of the first end plate 51 and the core body member 41 cannot be made.

Similar to the first embodiment, the cutout portion formed at the one of the first end plate 51 and the second end plate and cutout portion the one of the first end plate 51 and the second end plate are located on opposite sides relative to the rotational axis C.

Although the second embodiment is described regarding the first end plate 51, the construction of the second embodiment may be applied to the second end plate. According to the second embodiment, the size of the cutout portions 512a, 512b is different from each other corresponding to the size of the first positioning pins 84a, 84b which are configured to be engaged with the cutout portions 512a, 512b, respectively. However, by forming at least one of the shape and the size of the cutout portions 512a, 512b to be different, the first end plate 51 and the core body member 41 are prevented from being assembled when the first end plate 51 is arranged in the reversed state.

According to the construction of the second embodiment, the two cutout portions 512a, 512b are formed on the outer circumference 511 of the first end plate 51 and the size of the cutout portion 512b is larger than the size of the cutout portion 512a. When the end plate 51 is placed facing the side face of the core body member 41 with reversed state, the positioning pin 84b which is formed with larger diameter contacts the cutout portion 512a which cannot be engaged with the positioning pin 84b. Therefore, the first end plate 51 and the core body member 41 are surely prevented from being assembled when the first end plate 51 is arranged in the reversed state.

<Third Embodiment>

Figure 11:
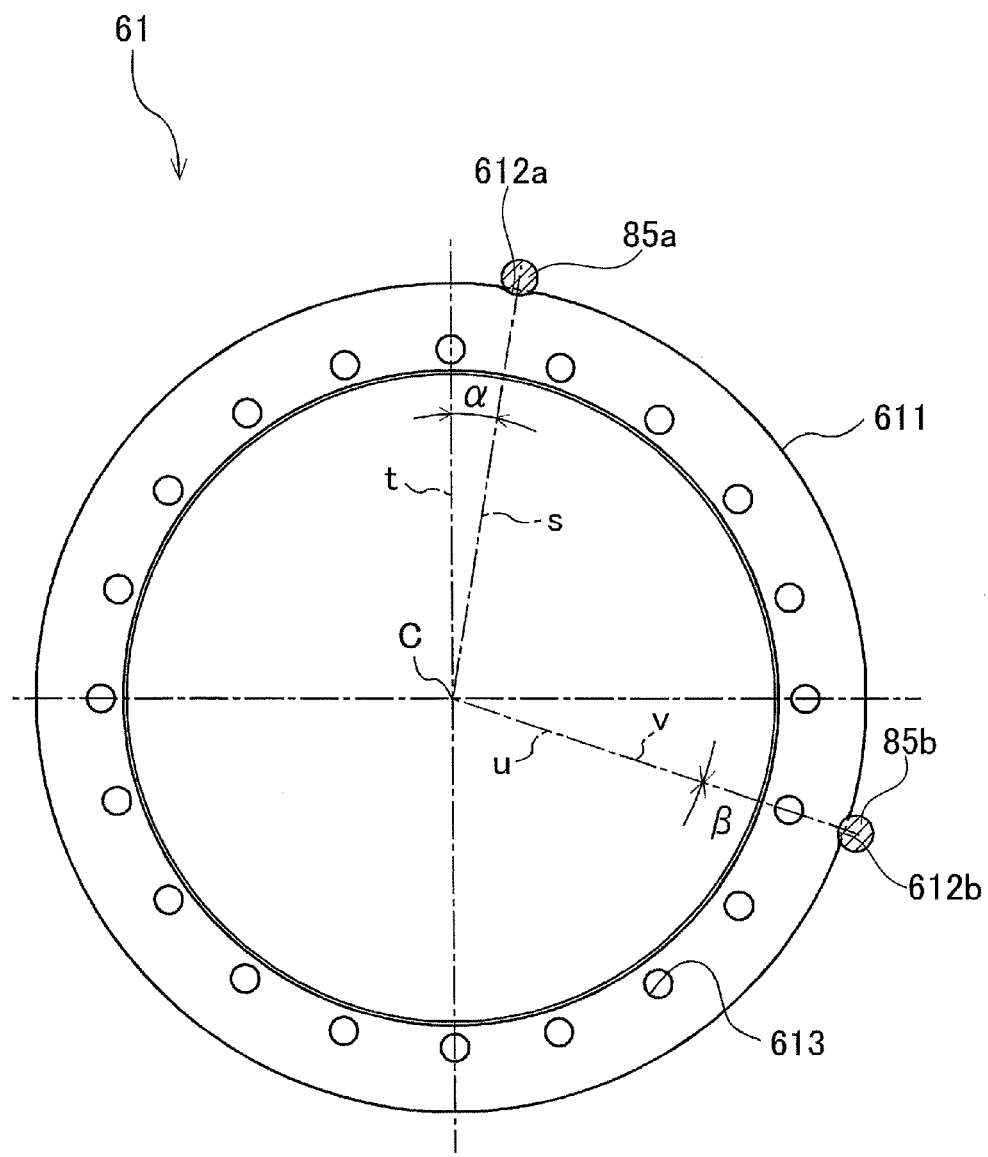
FIG. 11 is a plain view illustrating the first end plate according to a third embodiment disclosed here.

A first end plate 61 according to a third embodiment will be explained with reference to FIGS. 11 and 12. As shown in FIG. 11, two cutout portions 612a, 612b are formed on an outer circumference of the first end plate 61. The cutout portion 612a is provided on a line (q-axis) which is perpendicularly drawn from an intermediate point between two adjoining caulking holes 613 to the rotational axis C. On the other hand, the cutout portion 612b is also provided on a line (d-axis) which is perpendicularly drawn from a caulking holes 613 to the rotational axis C.

In other words, as shown in FIG. 11, an angle a defined by a line s which is perpendicularly drawn from the cutout portion 612a to the rotational axis C and a line t which is perpendicularly drawn from the caulking hole 613, which is positioned closest to the cutout portion 612a, to the rotational axis C is different from an angle β (in the third embodiment, the angle β is 0 degree) defined by a line u which is perpendicularly drawn from the cutout portion 612b to the rotational axis C and a line v which is perpendicularly drawn from the caulking hole 613, which is positioned closest to the cutout portion 612b, to the rotational axis C.

Each cutout portion 612a, 612b is formed to have same shape and size and to have approximately arc shape by cutting out a circumference 611 of the first end plate 61, and the cutout portions 612a, 612b is engageable with corresponding first positioning pins 85a, 85b (shown in FIG. 11).

Figure 12:
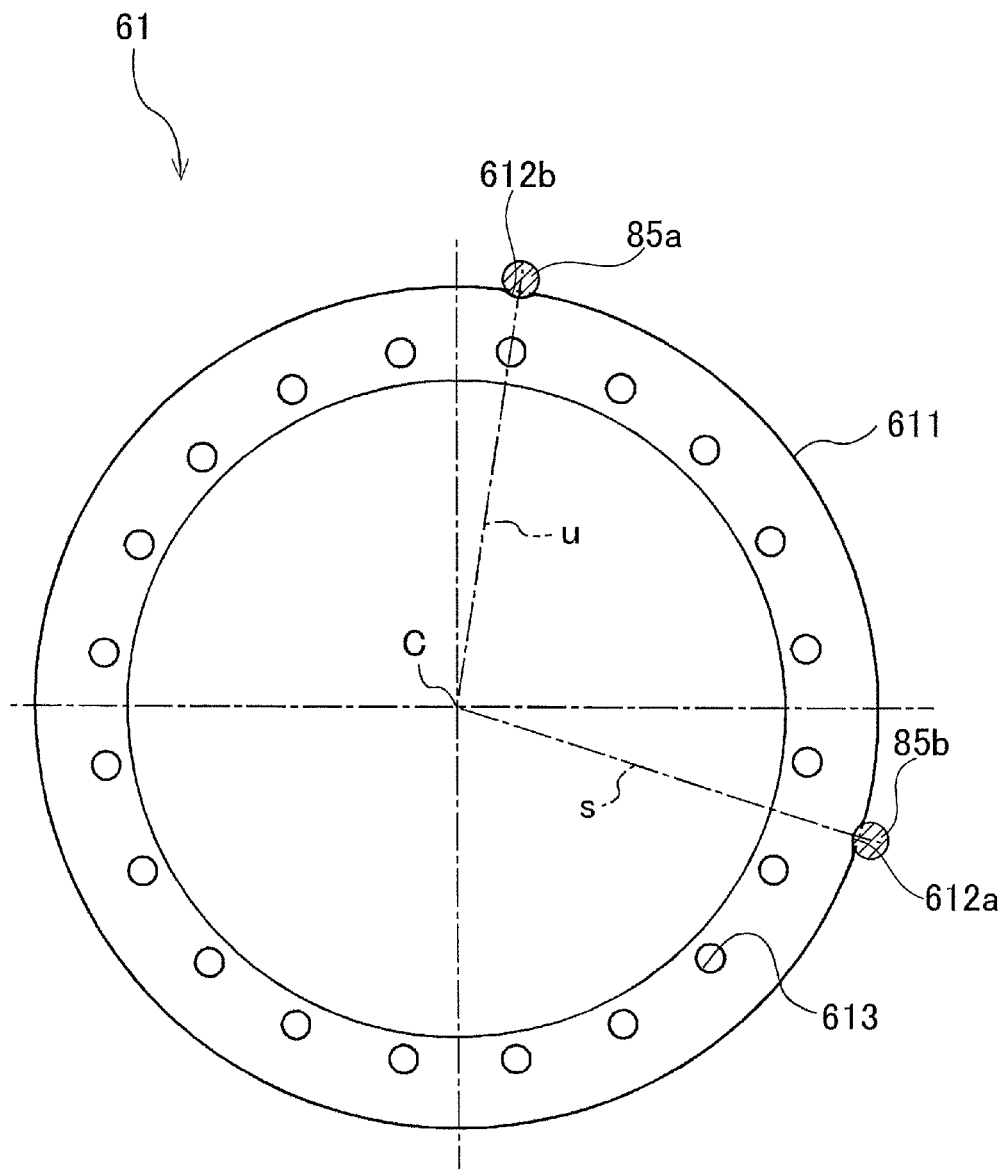
FIG. 12 is a plain view illustrating a reversed state of the first end plate shown in FIG. 11.

As shown in FIG. 12, when the first end plate 61 is placed with reversed state, that is, a reverse side of the first end plate 61 is arranged to face the core body member 41, the cutout portions 612a, 612b can be engaged with the first positioning pin 85b, 85a, respectively. On the other hand, compared to the case that the first end plate 61 is placed in correct state, the position of all caulking holes 613 are shifted in a circumferential direction (in other words, the position of the caulking hole 613 is shifted relative to the position of the through hole which is provided on the core body member 41 and receives the fixing pin 45). Therefore, the fixing pin 45 cannot be inserted to the caulking hole 613 of the first end plate 61, and assembling of the first end plate 61 and the core body member 41 cannot be made.

For the relationship between the first end plate 61 and a second end plate in accordance with the third embodiment, it is similar to the first embodiment that one of the cutout portion of the first end plate 61 and one of the cutout portion of the second end plate are located at opposite sides relative to the rotational axis C.

Although the third embodiment is described regarding the first end plate 61, the construction of the third embodiment may be applied to the second end plate. Although the cutout portions 612a, 612b are respectively formed along the q-axis and the d-axis as described in the third embodiment, it is not required to form the cutout portions 612a, 612b along the q-axis or the d-axis. As long as the angle α defined by the line s which is perpendicularly drawn from one of the cutout portion 612a to the rotational axis C and the line t which is perpendicularly drawn from the caulking hole 613, which is provided nearest to the cutout portion 612a, to the rotational axis C differs from the angle β defined by the line u which is perpendicularly drawn from another one of the cutout portion 612b to the rotational axis C and the line v which is perpendicularly drawn from the caulking hole 613, which is provided nearest to the cutout portion 612b, to the rotational axis C, the effect of the construction of the third embodiment is attained.

According to the construction of the third embodiment, the two cutout portions 612a, 612b are formed on the outer circumference 611 of the first end plate 61 and the cutout portions 612a is provided on the line s which is perpendicularly drawn from the intermediate point between two adjoining caulking holes 613 to the rotational axis C and the cutout portions 612b is provided on the line u, which is perpendicularly drawn from the caulking holes 613, to the rotational axis C. Therefore, since the position of all caulking holes 613 is shifted in circumferential direction, the first end plate 61 is surely prevented from being assembled with the core body member 41 when the first end plate 61 is arranged in the reversed state.

<Other Embodiment>

The invention is not to be considered limited to what is shown in the drawings and described in the embodiment. Further variation or extension may be available as follows.

Figure 13:
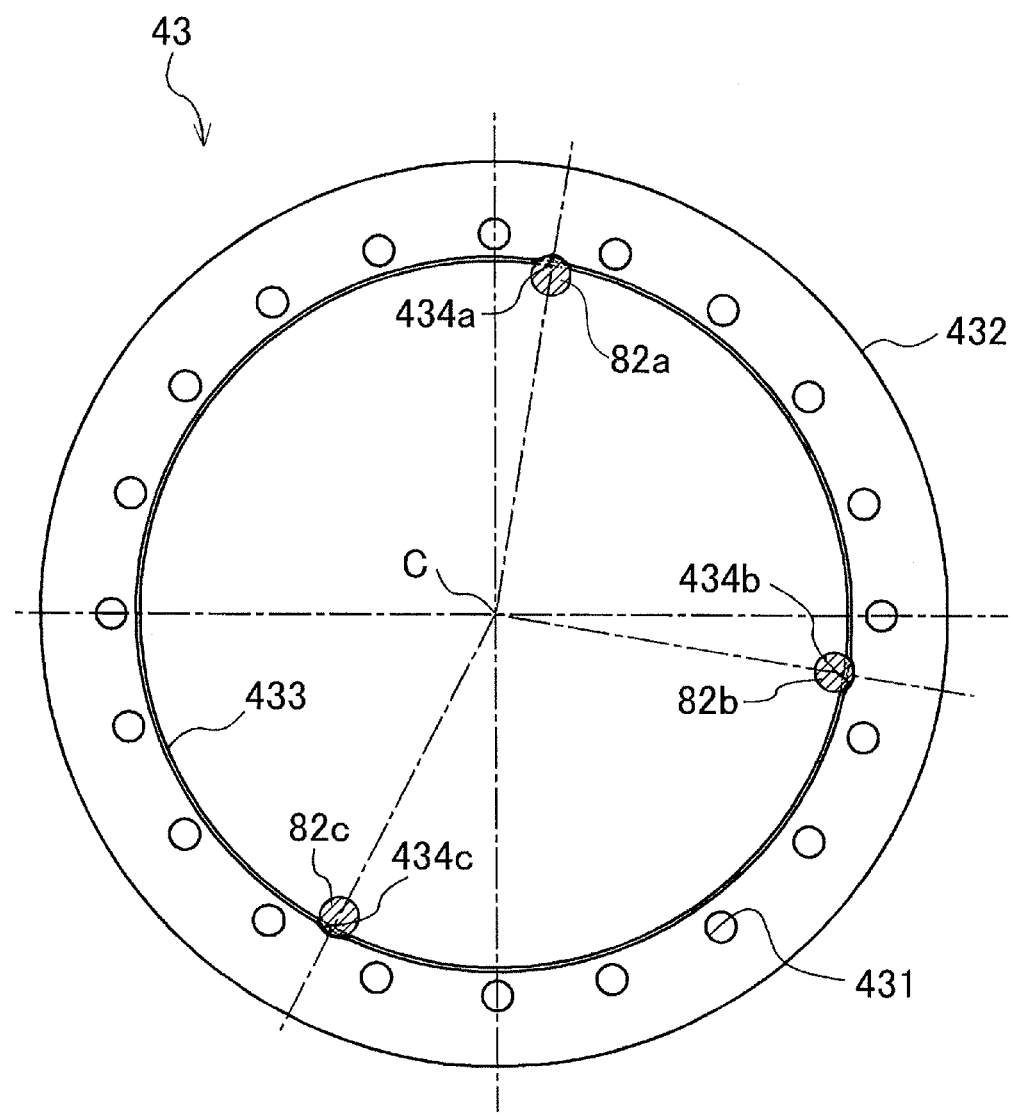
FIG. 13 is a plain view illustrating the first end plate according to another embodiment disclosed here.

For example, the cutout portion 434a, 434b, 434c, 445a, 445b, 445c may be provided at the inner circumference 433, 443 of the end plate 43, 44. Accordingly, the positioning pin 82a, 82b, 82c, 83a, 83b, 83c may be provided at radially inner portion of the end plate 43, 44. FIG. 13 shows a modified example applied to the first end plate 43. Therefore, an assembling equipment of the rotor 4 may be downsized.

In addition, according to the first embodiment, four or more cutout portion may be provided at both or one of the end plates 43, 44. Accordingly, four or more first positioning pins and four or more the second positioning pins may be provided in response to the position of the cutout portions.

Figure 14:
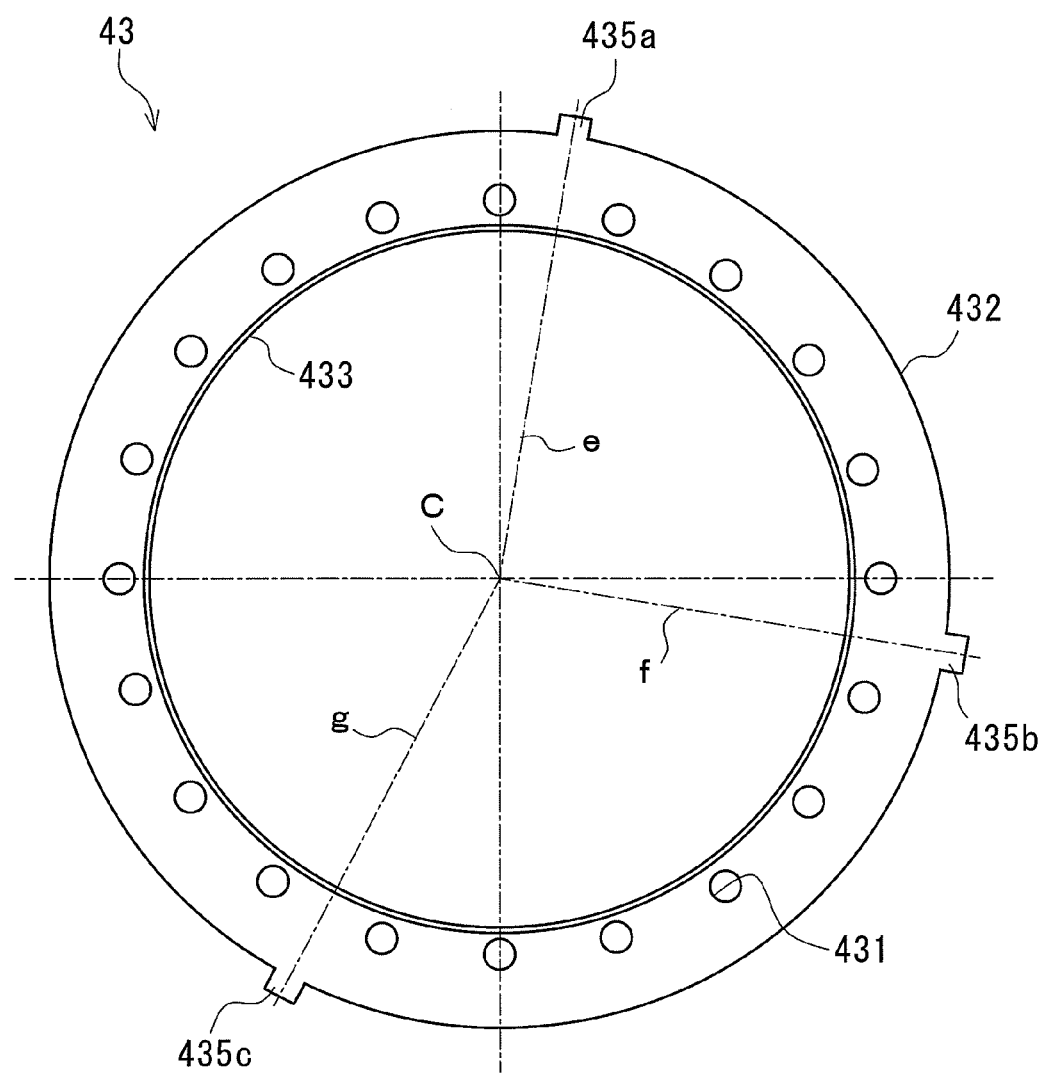
FIG. 14 is a plain view illustrating modified embodiment of the first embodiment shown in FIG. 2.
Figure 15:
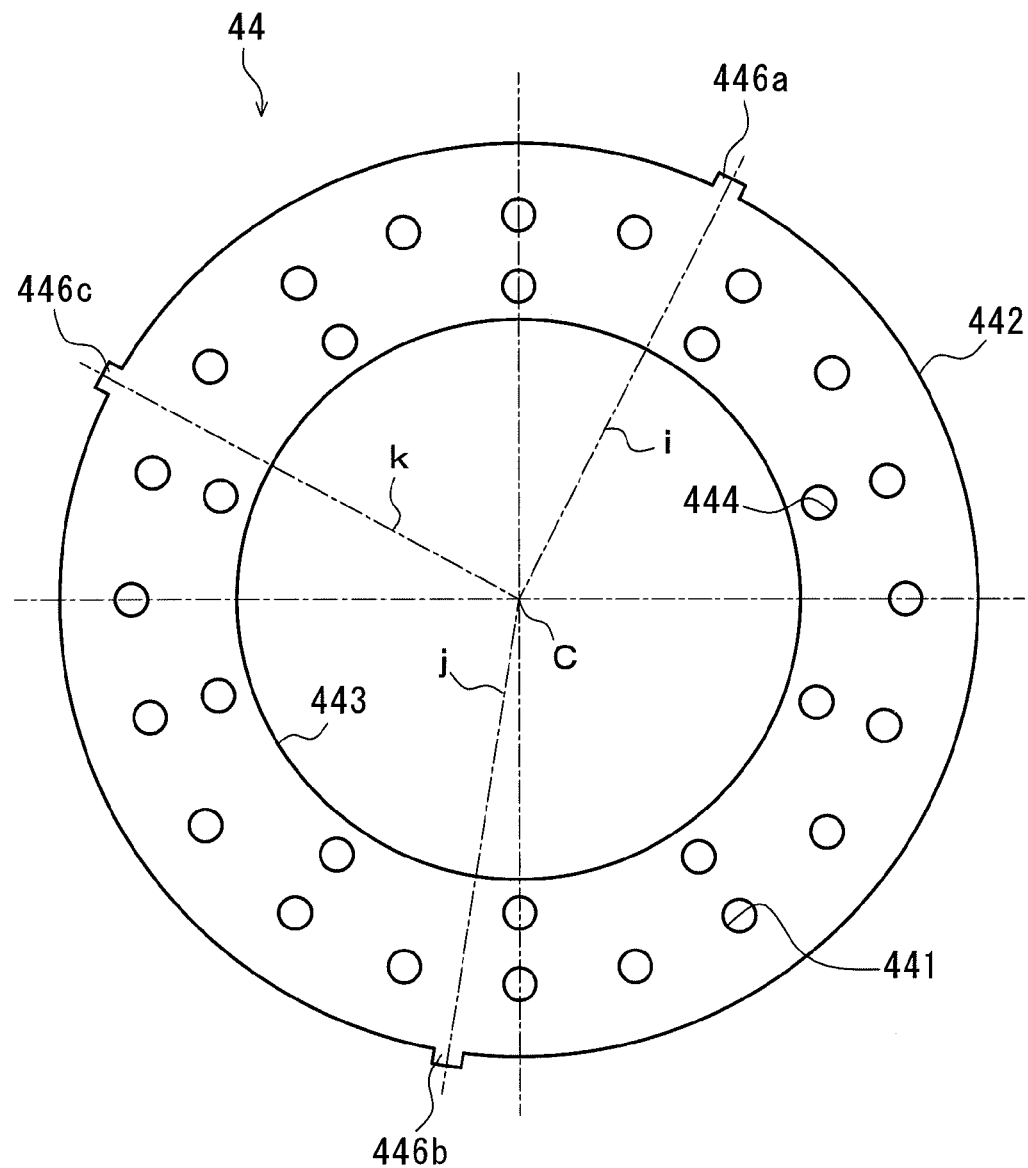
FIG. 15 is a plain view illustrating modified embodiment of the first embodiment shown in FIG. 3.

In addition, as shown in FIGS. 14 and 15, instead of cutout portions 434a, 434b, 434c, 445a, 445b, 445c, projecting portions 435a, 435b, 435c, 446a, 446b, 446c may be provided as the positioning portions. The projecting portions 435a, 435b, 435c, 446a, 446b, 446c have a protruding shape formed at the end plates 43, 44, respectively. Although the projecting portions 435a, 435b, 435c, 446a, 446b, 446c are provided at the outer circumference of the end plates 43, 44 in FIGS. 14 and 15, the projecting portions may be provided at the inner circumference of the end plates 43, 44. In accordance with the position of the projecting portions 435a, 435b, 435c, 446a, 446b, 446c, recessed positioning pins (corresponding to the positioning receive portion) may be provided instead of the positioning pins 82a, 82b, 82c, 83a, 83b, 83c. The concave positioning pins are provided on the outer portion or the inner portion in a radial direction of the end plates 43, 44, and includes a recessed portion which can be engaged to the projecting portion 435a, 435b, 435c, 446a, 446b, 446c in the fixing process.

In addition, instead of the fixing pin 45, a bolt may be used for penetrating the end plates 43, 44 and the core body member 41. In those circumstances, the core body member 41 is sandwiched to be retained by the end plates 43, 44 by tightening the penetrated bolt and a nut.

In addition, the electric motor 1 according to the embodiments may be applied to a synchronous motor, an induction motor, a direct-current motor or other any electric rotating machine. In addition, the electric motor 1 or the electric rotating machine according to the embodiments may be used only as an electric motor or an electric generator.

According to an aspect of this disclosure, a rotor 4 for an electric rotating machine 1 includes a core body member 41 formed by stacking a plurality of core plates 42 in an axial direction along a rotational axis C, and including a plurality of through holes; first and second end plates 43, 44, 51, 61 annually formed and provided at respective side faces of the core body member 41, and including a plurality of through holes 431, 441, 513, 613; and a fixing member 45 inserted into each of the plurality of through holes 431, 441, 513, 613 provided at the core body member 41 and the first and second end plates 43, 44, 51, 61, and engaged with each of the first and second end plates 43, 44, 51, 61 at opposite ends of the fixing member 45; a plurality of positioning portions 434a, 434b, 434c, 435a, 435b, 435c, 445a, 445b, 445c, 446a, 446b, 446c, 512a, 512b, 612a, 612b provided at an outer circumferential surface 432, 442, 511, 611 or inner circumferential surface 433, 443 of each of the first and second end plates 43, 44, 51, 61, wherein when the fixing member 45 is engaged with the first and second end plates 43, 44, 51, 61, the positioning portions 434a, 434b, 434c, 435a, 435b, 435c, 445a, 445b, 445c, 446a, 446b, 446c, 512a, 512b, 612a, 612b are engaged with positioning receive portions 82a, 82b, 82c, 83a, 83b, 83c, 84a, 84b, 85a, 85b corresponding to the positioning portion 434a, 434b, 434c, 435a, 435b, 435c, 445a, 445b, 445c, 446a, 446b, 446c, 512a, 512b, 612a, 612b and positioning at radially outer portion or radially inner portion of the first and second end plates 43, 44, 51, 61. When one of the first and second end plates 43, 44, 51, 61 is placed facing the side face of the core body member 41 in a reversed state, the first and second end plates 43, 44, 51, 61 and the core body 41 member are not assembled each other for at least one of the following reasons: a portion X, Y, at which the positioning portion 434a, 434b, 434c, 435a, 435b, 435c, 445a, 445b, 445c, 446a, 446b, 446c is not provided, allocated at the outer circumferential surface 432, 442 or the inner circumferential surface 433, 443 of the first and second end plates 43, 44 contacts one of the positioning receive portions 82a, 82b, 82c, 83a, 83b, 83c; the positioning portion 512a, 512b which is not engageable with the positioning receive portion 84a, 84b contacts to the positioning receive portion 84b, 84a; and a relative position between the through hole of the core body member 41 and the through hole 613 of the first and second end plates 611 is shifted in a circumferential direction. In a state where one of the first and second end plates 43, 44, 51, 61 is placed facing the side face of the core body member 41 in a correct state, one of the positioning portions 434a, 434b, 434c, 435a, 435b, 435c, 512a, 512b, 612a, 612b of the first end plate 43, 51, 61 and one of the positioning portions 445a, 445b, 445c, 446a, 446b, 446c of the second end plate 44 are located at opposite sides relative to the rotational axis C.

Therefore, the first and second end plates 43, 44, 51, 61 and the core body member 41 are prevented from being assembled with reversed state. In addition, weight balance of the rotor 4 can be optimized, vibration and noise caused by rotation of the rotor 4 is reduced, and rotation of the rotor 4 is stabilized.

According to another aspect of this disclosure, at least three positioning portions 434a, 434b, 434c, 435a, 435b, 435c, 445a, 445b, 445c, 446a, 446b, 446c are formed at the outer circumference surface 432, 442 or the inner circumference surface 433, 443 of the first and second end plates 43, 44, and a circumferential distance between two of the adjoining positioning portions 434a, 434b, 434c, 435a, 435b, 435c, 445a, 445b, 445c, 446a, 446b, 446c is different from a circumferential distance between other combinations of the adjoining positioning portions 434a, 434b, 434c, 435a, 435b, 435c, 445a, 445b, 445c, 446a, 446b, 446c.

Therefore, the first and second end plates 43, 44 and the core body member 41 are surely prevented from being assembled with reversed state.

According to another aspect of this disclosure, the positioning portions 512a, 512b include two positioning portions 512a, 512b and are formed at the outer circumference surface 511 or the inner circumference surface of one of the first and second end plates 51, and at least one of size and shape of the one positioning portion 512a formed at the one of the first and second end plates 51 is different from said at least one of size and shape of the other positioning portion 512b formed at the one of the first and second end plates 51.

Therefore, the first and second end plates 51 and the core body member 41 are surely prevented from being assembled with reversed state.

According to another aspect of this disclosure, the positioning portions 612a, 612b include two positioning portions 612a, 612b and are formed at the outer circumference surface 611 or the inner circumference surface of the first and second end plates 61, and an angle a defined by a line s perpendicularly drawn from the one positioning portion 612a to the rotational axis C and a line t perpendicularly drawn from the through hole 613 positioned closest to the one positioning portion 612a to the rotational axis C is different from an angle β defined by a line u perpendicularly drawn from the other positioning portion 612b to the rotational axis C and a line v perpendicularly drawn from the through hole 613 positioned closest to the other positioning portion 612b to the rotational axis C.

Therefore, the first and second end plates 61 and the core body member 41 are surely prevented from being assembled with reversed state.

According to another aspect of this disclosure, at least one of the positioning portions 434a, 434b, 434c, 445a, 445b, 445c, 512a, 512b, 612a, 612b is formed to have a recessed shape and at least one of the positioning receive portions 82a, 82b, 82c, 83a, 83b, 83c, 84a, 84b, 85a, 85b is formed to have a protruding shape.

Therefore, when at least one of the positioning portions 434a, 434b, 434c, 445a, 445b, 445c, 512a, 512b, 612a, 612b and at least one of the positioning receive portions 82a, 82b, 82c, 83a, 83b, 83c, 84a, 84b, 85a, 85b are engaged with each other, the first and second endplates 43, 44, 51, 61 and the core body member 41 are surely prevented from displacement in a circumferential direction of the first and second endplates 43, 44, 51, 61.

According to another aspect of this disclosure, at least one of the positioning portions 434a, 434b, 434c, 445a, 445b, 445c, 512a, 512b, 612a, 612b is formed as a cutout portion.

Therefore, at least one of the positioning portions 434a, 434b, 434c, 445a, 445b, 445c, 512a, 512b, 612a, 612b can be formed simply in a low-cost process.

According to another aspect of this disclosure, at least one of the positioning receive portions 82a, 82b, 82c, 83a, 83b, 83c, 84a, 84b, 85a, 85b is provided as a projection on an assembling base 81 for the second end plate 44 and on a check plate 85 used for checking assembling state of the first end plate 43, 51, 61.

Therefore, at least one of the positioning receive portions 82a, 82b, 82c, 83a, 83b, 83c, 84a, 84b, 85a, 85b can be formed simply in a low-cost process.

According to another aspect of this disclosure, at least one of the positioning portions 435a, 435b, 435c, 446a, 446b, 446c is formed to have a protruding shape and at least one of the positioning receive portions is formed to have a recessed shape.

Therefore, when at least one of the positioning portions 435a, 435b, 435c, 446a, 446b, 446c and at least one of the positioning receive portions are engaged with each other, the first and second endplates 43, 44 and the core body member 41 are surely prevented from occurring displacement in a circumferential direction of the first and second endplates 43, 44.

According to another aspect of this disclosure, at least one of the positioning portions 435a, 435b, 435c, 446a, 446b, 446c is formed as a projection on the first and second end plates 43, 44.

Therefore, at least one of the positioning portions 435a, 435b, 435c, 446a, 446b, 446c can be formed simply in a low-cost process.

According to another aspect of this disclosure, at least one of the positioning portions 434a, 434b, 434c, 435a, 435b, 435c, 445a, 445b, 445c, 446a, 446b, 446c, 512a, 512b, 612a, 612b is received by at least one of the positioning receive portions 82a, 82b, 82c, 83a, 83b, 83c, 84a, 84b, 85a, 85b which is provided on an assembling base for the second end plate 44 and on a check plate 85 used for checking assembling state of the first end plate 43, 51, 61.

Therefore, the when at least one of the positioning portions 434a, 434b, 434c, 435a, 435b, 435c, 445a, 445b, 445c, 446a, 446b, 446c, 512a, 512b, 612a, 612b and at least one of the positioning receive portions 82a, 82b, 82c, 83a, 83b, 83c, 84a, 84b, 85a, 85b are engaged with each other, the first and second endplates 43, 44, 51, 61 and the core body member 41 are surely prevented from occurring displacement in a circumferential direction of the first and second endplates 43, 44, 51, 61.

According to another aspect of this disclosure, a method for manufacturing a rotor 4 for an electric rotating machine 1 includes processes of: forming a core body member 41 by stacking a plurality of core plates 42 in an axial direction along a rotational axis C; fixing a first end plate 43, 51, 61, the core body member 41 and a second end plate 44 by placing the core body member 41 between the first end plate 43, 51, 61 and the second end plate 44 in the axial direction along the rotational axis C, inserting fixing member into each of a plurality of through holes 431, 441, 513, 613 provided at the first end plate 43, 51, 61, the core body member 41 and the second end plate 44, and engaging opposite ends of the fixing member 45 with the first end plate 43, 51, 61 and the second end plate 44; wherein a plurality of positioning portions 434a, 434b, 434c, 435a, 435b, 435c, 445a, 445b, 445c, 446a, 446b, 446c, 512a, 512b, 612a, 612b provided at an outer circumferential surface 432, 442, 511, 611 or inner circumferential surface 433, 443 of the first end plate and the second end plate 43, 44, 51, 61 is engaged with positioning receive portions 82a, 82b, 82c, 83a, 83b, 83c, 84a, 84b, 85a, 85b corresponding to the positioning portion 434a, 434b, 434c, 435a, 435b, 435c, 445a, 445b, 445c, 446a, 446b, 446c, 512a, 512b, 612a, 612b and positioning at radially outer portion or radially inner portion of the first and second end plates 43, 44, 51, 61. When one of the first and second end plates 43, 44, 51, 61 is placed facing the side face of the core body member 41 in a reversed state, the first and second end plates 43, 44, 51, 61 and the core body member 41 are not assembled each other for at least one of the following reasons: a portion X, Y, at which the positioning portion 434a, 434b, 434c, 435a, 435b, 435c, 445a, 445b, 445c, 446a, 446b, 446c is not provided, allocated at the outer circumferential surface 432, 442 or the inner circumferential surface 433, 443 of the first and second end plates 43, 44, 51, 61 contacts one of the positioning receive portions 82a, 82b, 82c, 83a, 83b, 83c; the positioning portion 512a, 512b which is not engageable with the positioning receive portion 84a, 84b contacts to the positioning receive portion 84a, 84b; and a relative position between the through hole of the core body member 41 and the through hole 613 of the first and second end plates 611 is shifted in a circumferential direction. In a state where one of the first and second end plates 43, 44, 51, 61 is placed facing the side face of the core body member 41 in a correct state, one of the positioning portions 434a, 434b, 434c, 435a, 435b, 435c, 512a, 512b, 612a, 612b of the first end plate 43, 51, 61 and one of the positioning portions 445a, 445b, 445c, 446a, 446b, 446c of the second end plate 44 are located at opposite sides relative to the rotational axis C.

Therefore, the first and second end plates 43, 44, 51, 61 and the core body member 41 are prevented from being assembled with reversed state. In addition, weight balance of the rotor 4 can be optimized, vibration and noise caused by rotation of the rotor 4 is reduced, and rotation of the rotor 4 is stabilized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotor for an electric rotating machine, comprising:
a core body member formed by stacking a plurality of core plates in an axial direction along a rotational axis, and including a plurality of through holes;
first and second end plates annually formed and provided at respective side faces of the core body member, and including a plurality of through holes; and
a fixing member inserted into each of the plurality of through holes provided at the core body member and the first and second end plates, and engaged with each of the first and second end plates at opposite ends of the fixing member;
a plurality of positioning portions provided at an outer circumferential surface or inner circumferential surface of each of the first and second end plates, wherein when the fixing member is engaged with the first and second end plates, the positioning portions are engaged with positioning receive portions corresponding to the positioning portion and positioning at radially outer portion or radially inner portion of the first and second end plates; wherein
when one of the first and second end plates is placed facing the side face of the core body member in a reversed state, the first and second end plates and the core body member are not assembled with each other because;
a relative position between a through hole of the core body member and a through hole of the first and second end plates is shifted in a circumferential direction; wherein in a state where one of the first and second end plates is placed facing the side face of the core body member in a correct state, one of the positioning portions of the first end plate and one of the positioning portions of the second end plate are located at opposite sides relative to the rotational axis;
wherein the positioning portions include two positioning portions and are formed at the outer circumference surface or the inner circumference surface of the first and second end plates, and an angle defined by a line perpendicularly drawn from one positioning portion to the rotational axis and a line perpendicularly drawn from the through hole positioned closest to the one positioning portion to the rotational axis is different from an angle defined by a line perpendicularly drawn from the other positioning portion to the rotational axis and a line perpendicularly drawn from the through hole positioned closest to the other positioning portion to the rotational axis; and wherein the positioning portions correspond to cutout portions.

2. The rotor for the electric rotating machine according to claim 1, wherein at least three positioning portions are formed at the outer circumference surface or the inner circumference surface of the first and second end plates, and a circumferential distance between two of the adjoining positioning portions is different from a circumferential distance between other combinations of the adjoining positioning portions.

3. The rotor for the electric rotating machine according to claim 1, wherein at least one of size and shape of the one positioning portion formed at the one of the first and second end plates is different from at least one of size and shape of the other positioning portion formed at the one of the first and second end plates.

4. The rotor for the electric rotating machine according to claim 1, wherein at least one of the positioning portions is formed to have a recessed shape and at least one of the positioning receive portions is formed to have a protruding shape.

5. The rotor for the electric rotating machine according to claim 4, wherein at least one of the positioning receive portions is provided as a projection on an assembling base for the second end plate and on a check plate used for checking assembling state of the first end plate.

6. A method for manufacturing a rotor for an electric rotating machine, comprising processes of:

forming a core body member by stacking a plurality of core plates in an axial direction along a rotational axis;

fixing a first end plate, the core body member and a second end plate by placing the core body member between the first end plate and the second end plate in the axial direction along the rotational axis, inserting fixing member into each of a plurality of through holes provided at the first end plate, the core body member and the second end plate, and engaging opposite ends of the fixing member with the first end plate and the second end plate; wherein a plurality of positioning portions provided at an outer circumferential surface or inner circumferential surface of the first end plate and the second end plate is engaged with positioning receive portions corresponding to the positioning portion and positioning at radially outer portion or radially inner portion of the first and second end plates; wherein when one of the first and second end plates is placed facing side faces of the core body member in a reversed state, the first and second end plates and the core body member are not assembled with each other because a relative position between a through hole of the core body member and a through hole of the first and second end plates is shifted in a circumferential direction;

wherein in a state where one of the first and second end plates is placed facing the side face of the core body member in a correct state, one of the positioning portions of the first end plate and one of the positioning portions of the second end plate are located at opposite sides relative to the rotational axis;

wherein the positioning portions include two positioning portions and are formed at the outer circumference surface or the inner circumference surface of the first and second end plates, and an angle defined by a line perpendicularly drawn from the one positioning portion to the rotational axis and a line perpendicularly drawn from the through hole positioned closest to the one positioning portion to the rotational axis is different from an angle defined by a line perpendicularly drawn from the other positioning portion to the rotational axis and a line perpendicularly drawn from the through hole positioned closest to the other positioning portion to the rotational axis; and wherein the positioning portions correspond to cutout portions.

7. A rotor for an electric rotating machine, comprising: a core body member formed by stacking a plurality of core plates in an axial direction along a rotational axis, and including a plurality of through holes;

first and second end plates annually formed and provided at respective side faces of the core body member, and including a plurality of through holes; and a fixing member inserted into each of the plurality of through holes provided at the core body member and the first and second end plates, and engaged with each of the first and second end plates at opposite ends of the fixing member;

a plurality of positioning portions provided at an outer circumferential surface or an inner circumferential surface of each of the first and second end plates, wherein when the fixing member is engaged with the first and second end plates, the positioning portions are engaged with positioning receive portions corresponding to the positioning portion and positioning at radially outer portion or radially inner portion of the first and second end plates;

wherein when one of the first and second end plates is placed facing the side face of the core body member in a reversed state, the first and second end plates and the core body member are not assembled with each other because the positioning portion which is not fittable relative to the positioning receive portion contacts the positioning receive portion, a portion, at which the positioning portion is not provided, allocated at the outer circumferential surface or the inner circumferential surface of the first and second end plates contacts a side surface of one of the positioning receive portions in the axial direction, or the positioning receive portion contacts a side surface of the positioning portion which is not fittable relative to the positioning receive portion in the axial direction;

wherein the positioning portions include two positioning portions and are formed at the outer circumference surface or the inner circumference surface of one of the first and second end plates, and at least one of size and shape of the one positioning portion formed at the one of the first and second end plates is different from said at least one of size and shape of the other positioning portion formed at the one of the first and second end plates;

wherein at least one of size and shape of the positioning receive portion differs between the positioning receive portions and said at least one of the size and shape of one of the positioning receive portions agree with the corresponding positioning portion; and wherein in a state where one of the first and second end plates is placed facing the side face of the core body member in a correct state, one of the positioning portions of the first end plate and one of the positioning portions of the second end plate are located at opposite sides relative to the rotational axis.

* * * * *